(12) United States Patent
Rose

(10) Patent No.: US 8,089,028 B2
(45) Date of Patent: Jan. 3, 2012

(54) METHODS FOR REPAIRING GAS TURBINE ENGINE KNIFE EDGE SEALS

(75) Inventor: William M. Rose, Warren, MA (US)

(73) Assignee: United Technologies Corp., E. Hartford, CT (US)

(*) Notice: Subject to any disclaimer, the term of this patent is extended or adjusted under 35 U.S.C. 154(b) by 1196 days.

(21) Appl. No.: 11/782,057

(22) Filed: Jul. 24, 2007

(65) Prior Publication Data
US 2009/0026183 A1 Jan. 29, 2009

(51) Int. Cl.
B23K 26/34 (2006.01)
B23P 6/00 (2006.01)
F01D 11/00 (2006.01)

(52) U.S. Cl. ............ 219/121.64; 29/402.06; 148/428; 148/525

(58) Field of Classification Search ............ 219/121.64; 29/889.1, 402.02, 402.06, 402.18, 402.07; 148/525, 428
See application file for complete search history.

(56) References Cited

U.S. PATENT DOCUMENTS

| 4,159,410 | A | | 6/1979 | Cooper |
| 4,323,756 | A | * | 4/1982 | Brown et al. ............ 219/121.85 |
| 4,426,191 | A | | 1/1984 | Brodell et al. |
| 4,483,054 | A | | 11/1984 | Ledwith |
| 4,743,165 | A | | 5/1988 | Ulrich |
| 4,878,953 | A | * | 11/1989 | Saltzman et al. ............ 29/889.1 |
| 4,924,581 | A | | 5/1990 | Jakobsen |
| 5,038,014 | A | * | 8/1991 | Pratt et al. ................ 219/121.64 |
| 5,071,054 | A | * | 12/1991 | Dzugan et al. ............... 29/889.1 |
| 5,374,319 | A | * | 12/1994 | Stueber et al. ................ 148/428 |
| 5,449,536 | A | * | 9/1995 | Funkhouser et al. ..... 219/121.85 |
| 6,422,815 | B1 | | 7/2002 | Marler et al. |
| 6,565,314 | B1 | | 5/2003 | Marler et al. |
| 6,884,964 | B2 | * | 4/2005 | Murphy ....................... 29/889.1 |
| 2003/0103844 | A1 | | 6/2003 | Marler et al. |
| 2004/0112280 | A1 | * | 6/2004 | Beck et al. ....................... 117/84 |
| 2006/0065650 | A1 | * | 3/2006 | Guo ........................ 219/121.84 |
| 2006/0168808 | A1 | * | 8/2006 | Lin et al. ...................... 29/889.1 |
| 2006/0219329 | A1 | | 10/2006 | Hu et al. |
| 2006/0219330 | A1 | * | 10/2006 | Hu et al. ....................... 148/428 |
| 2007/0023402 | A1 | | 2/2007 | Zajchowski et al. |
| 2008/0135530 | A1 | * | 6/2008 | Lee et al. ................. 219/121.64 |

OTHER PUBLICATIONS

Sun et al., "Direct Laser Deposition of Inconel 738 on directionally solidified Ni-base supperalloy component", Dec. 2005, SPIE, vol. 5629, pp. 84-92.*

* cited by examiner

Primary Examiner — Geoffrey S Evans
(74) Attorney, Agent, or Firm — Carlson, Gaskey & Olds, P.C.

(57) ABSTRACT

Methods for repairing a gas turbine engine knife edge seals are provided. A representative method includes: providing a knife edge of a gas turbine component, the component comprising IN-100, the knife edge being degraded; directing a laser beam toward the knife edge; and dispensing IN-100 powder such that the IN-100 powder is melted by the laser beam and is deposited on the knife edge.

21 Claims, 2 Drawing Sheets

US 8,089,028 B2

METHODS FOR REPAIRING GAS TURBINE ENGINE KNIFE EDGE SEALS

BACKGROUND

1. Technical Field

The disclosure generally relates to gas turbine engine repair.

2. Description of the Related Art

Turbine blades are typically mounted to a disk that is attached to a rotating spool for rotating the blades. In order to prevent gas from leaking around the distal ends of the blades, knife edge seals can be used. Conventionally, a knife edge seal is formed by a conformable portion of a turbine casing and a complementary-shaped distal end portion of a turbine blade known as "knife edge". In use, the knife edge can contact the turbine casing and, thus, tends to wear over time.

Traditionally, knife edges that are degraded, e.g., worn beyond prescribed operating limits, are remedied by replacement or repair. In the case of replacement, the entire disk and associated blades are removed from the engine and new disk and blades are installed. In the case of repair, a weld process or thermal spray can be used to build-up material at the wear location. However, some materials, such as IN-100 high-temperature nickel superalloy are not conventionally considered candidates for such repair due to the difficulty of welding IN100 material.

SUMMARY

Methods for repairing a gas turbine engine knife edge seals are provided. In this regard, an exemplary embodiment of a method comprises: providing a knife edge of a gas turbine component, the component comprising IN-100, the knife edge being degraded; directing a laser beam toward the knife edge; and dispensing IN-100 powder such that the IN-100 powder is melted by the laser beam and is deposited on the knife edge.

Another embodiment of a method comprises: providing a knife edge of a turbine disk, the disk being formed of IN-100, the knife edge being degraded; directing a laser beam toward the knife edge; and injecting IN-100 powder co-axially into the laser beam such that the IN-100 powder is melted by the laser beam and is deposited on the knife edge.

Still another embodiment of a method comprises: inspecting a knife edge of a turbine disk, the disk being formed of IN-100; determining that the knife edge is degraded; directing a laser beam toward the knife edge; and forming a layer of IN-100 on the knife edge using the laser beam and IN-100 powder.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

As will be described in detail here, methods for repairing gas turbine engine knife edge seals are provided. In this regard, several embodiments will be described that generally involve the use of powdered metal being melted and then deposited on the degraded end of a knife edge. In some embodiments, the material is built-up as a series of thin layers that can be sequentially applied in order to rebuild the knife edge to suitable operational dimensions. Notably, at least some of these methods may be used with IN-100, which has previously eluded repair by welding techniques.

Figure 1:
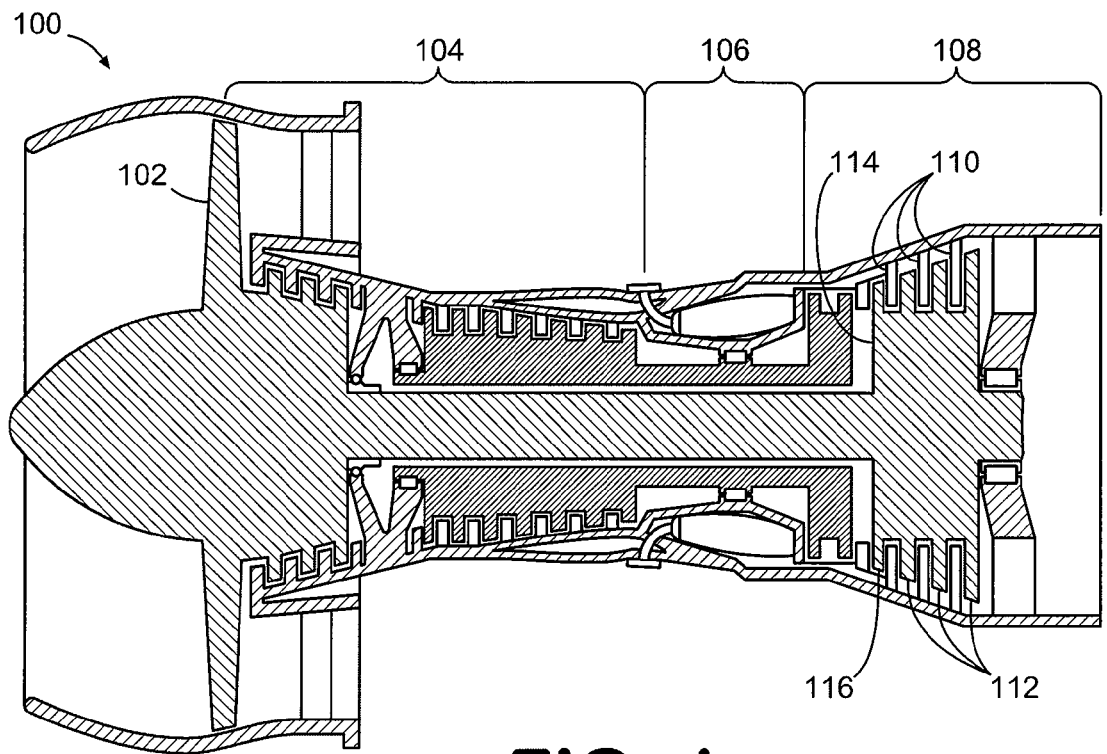
FIG. 1 is a schematic, cross-sectional view of an embodiment of a gas turbine engine.

Referring now to the drawings, FIG. 1 is a schematic diagram depicting a representative embodiment of a gas turbine engine 100. Although engine 100 is configured as a turbofan, there is no intention to limit the invention to use with turbofans as use with other types of gas turbine engines is contemplated.

As shown in FIG. 1, engine 100 incorporates a fan 102, a compressor section 104, a combustion section 106 and a turbine section 108. Notably, turbine section 108 includes alternating rows of stationary vanes 110 and rotating blades 112. In this embodiment, the blades are configured in sets, with each set being attached to a rotatable turbine disk. Disk 114 is an exemplary turbine disk that includes blades 116.

Figure 2:
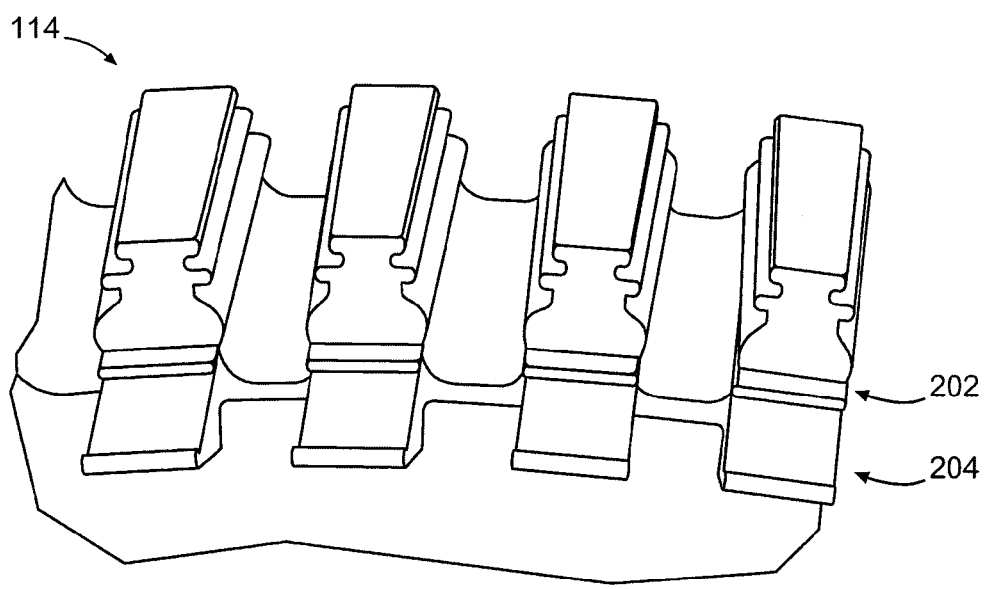
FIG. 2 is a schematic, partially cut-away view of an embodiment of a turbine disk with associated blades removed.

FIG. 2 is a schematic, partially cut-away view depicting a portion of disk 114 with the blades removed. In this embodiment, disk 114 is configured to create a compound knife edge seal comprising two seals. Specifically, a first set of knife edges 202 forms a first of the seals, and a second set of knife edges 204 forms a second of the seals. Note also that when the blades (not shown) are in installed on the turbine disk, each of the blades also incorporates two knife edges that complete the two annular sets of knife edges that form the compound seal. For additional information on knife edge seals of comparable configurations (known as "hammer head seals"), please refer to U.S. Patent Applications, Integrated Bladed Fluid Seal (U.S. patent application Ser. No. 11/260,357, filed on Oct. 27, 2005), Blade Neck Fluid Seal (U.S. patent application Ser. No. 11/146,660, filed on Jul. 7, 2005), and Combined Bladed Attachment and Disk Lug Fluid Seal (U.S. patent application Ser. No. 11/146,798, filed on Jul. 7, 2005), which are incorporated by reference herein.

Figure 3:
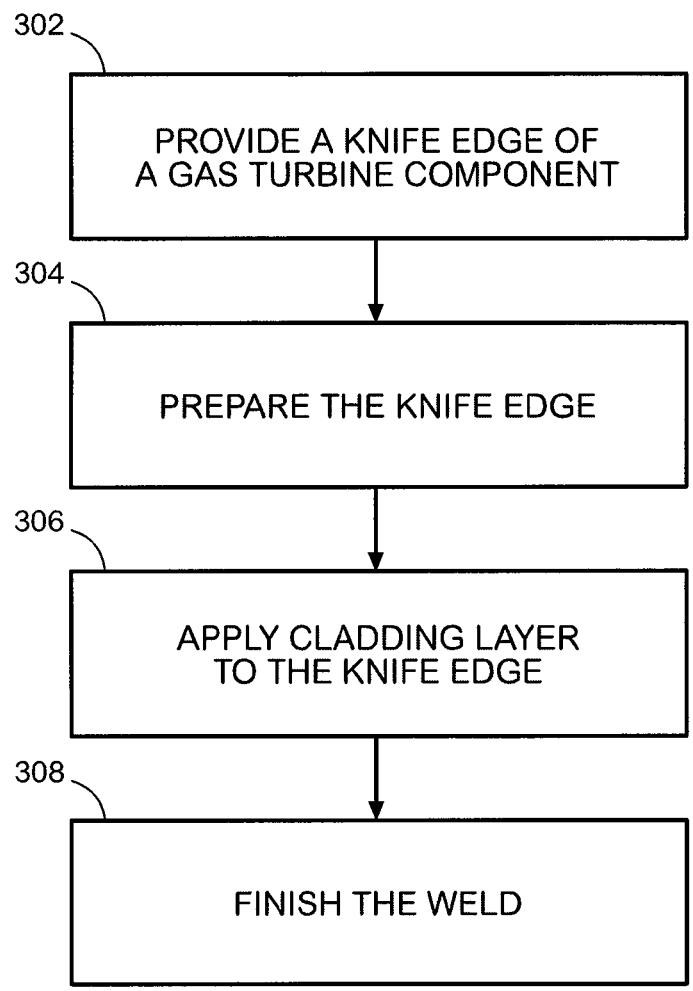
FIG. 3 is a flowchart depicting an embodiment of method for repairing a gas turbine engine.

At least some embodiments of turbine disks, such as those using hammer head seals, are formed of IN-100. As is known, materials such as IN-100 are not conventionally considered suitable for weld repair. This is because of a tendency to crack during the application of heat during thermal processing, including plasma arc welding. In this regard, FIG. 3 is a flowchart depicting an embodiment of a method that may be used for repairing IN-100 components. IN-100 is a vacuum melted and investment cast nickel-base alloy recommended for high temperature applications of approximately 1850-1900.degree. F. IN-100 was developed by International Nickel Co., Inc. The material composition includes: chromium 8.0-11.0%, cobalt 13.0-17.0%, molybdenum 2.0-4.0%, vanadium 0.70-1.20%, titanium 4.50-5.00%, aluminum 5.0-6.0%, carbon 0.15-0.20%, boron 0.01-0.02%, zirconium 0.03-0.09%, iron 1.0% maximum, manganese 0.20% maximum, silicon 0.20% maximum, sulfur 0.015% maximum, with the remainder being nickel.

As shown in FIG. 3, the method may be construed as beginning at block 302, in which a knife edge of a gas turbine component formed of IN-100 is provided. This can occur during an overhaul or repair procedure, for example, and may involve disassembly and/or cleaning of a turbine rotor, which includes the disk and attached blades.

If it is determined, such as during inspection, that the knife edge requires repair, the knife edge can be prepared for welding (block 304). This can include grinding and/or blending of the knife edge so that a surface suitable to receive weld material is available. In block 306, a cladding layer or layers are applied to the knife edge in order to build up a distal surface of the knife edge. Specifically, a laser is used to melt IN-100 powder that is dispensed in a vicinity of the laser. In some embodiments, the powder is injected co-axially into the laser beam so that the powder is melted and deposited on the knife edge. In some embodiments, a maximum particle size of the powder is between 44 μm (325 standard mesh size) and 149 μm (100 standard mesh size).

Depending upon material thickness, depositing of the material may be accomplished with an average power output of the laser of between 200 Watts and 1000 Watts, preferably between 300 Watts and 600 Watts. The function specified in block 306 is then repeated, as desired, to build up one or more layers of IN-100 material on the surface of the component. Although the number and thickness of such layers can be established as desired, a maximum thickness of each of the layers in some embodiments is between 0.25 mm and 1.27 mm, preferably between 0.51 mm and 0.64 mm. Such thickness may be considered preferable due to the reduced heat required to produce welds of this thickness.

In block 308, the weld is finished, such as by grinding and/or blending, to a desired profile. An example of a repair accomplished by the embodiment of FIG. 3 is depicted in FIG. 4.

Figure 4:
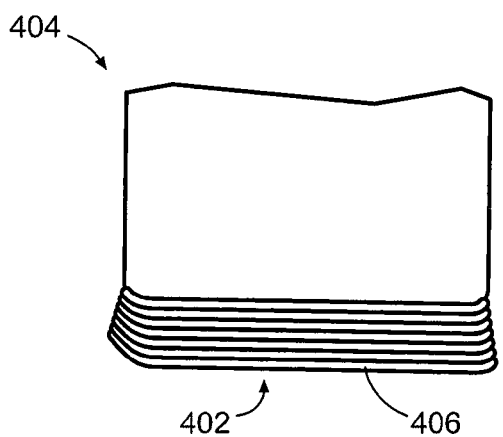
FIG. 4 is schematic diagram depicting layers of IN-100 deposited on a knife edge.

As shown in FIG. 4, the distal end 402 of a knife edge 404 has been built-up with seven sequentially applied layers (e.g., layer 406) of material. It should be noted that a device with an integrated laser and powder applicator capable of 5-axis motion (manufactured by Huffman Corp.) was used to provide the results depicted in FIG. 4. However, various other devices could be used.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A method for repairing a gas turbine engine knife edge seal comprising:
   providing a knife edge of a gas turbine component, the component comprising a material composition, the knife edge being degraded;
   directing a laser beam toward the knife edge; and
   dispensing a material composition powder such that the material composition powder is melted by the laser beam and is deposited on the knife edge and wherein said material composition comprises chromium 8.0-11.0%, cobalt 13.0-17.0%, molybdenum 2.0-4.0%, vanadium 0.70-1.20%, titanium 4.50-5.00%, aluminum 5.0-6.0%, carbon 0.15-0.20%, boron 0.01-0.02%, zirconium 0.03-0.09%, iron 1.0% maximum, manganese 0.20% maximum, silicon 0.20% maximum, sulfur 0.015% maximum, with the remainder being nickel.

2. The method of claim 1, wherein the material composition is deposited on the knife edge in separately formed layers.

3. The method of claim 2, wherein a maximum thickness of each of the layers is approximately 1.27 mm.

4. The method of claim 2, wherein a maximum thickness of each of the layers is approximately 0.64 mm.

5. The method of claim 1, wherein the component is a turbine disk.

6. The method of claim 5, wherein providing a knife edge comprises removing the turbine disk from the gas turbine.

7. The method of claim 1, wherein an average power output of the laser is between approximately 200 Watts and approximately 1000 Watts during the step of dispensing.

8. The method of claim 1, wherein an average power output of the laser is between approximately 300 Watts and approximately 600 Watts during the step of dispensing.

9. The method of claim 1, wherein, in dispensing the material composition powder, a maximum particle size of the powder is 149 μm.

10. The method of claim 1, wherein, in dispensing the material composition powder, a maximum particle size of the powder is 44 μm.

11. The method of claim 1, further comprising finishing the knife edge to a desired profile.

12. A method for repairing a gas turbine engine knife edge seal comprising:
    providing a knife edge of a turbine disk, the disk being formed of a material composition, the knife edge being degraded;
    directing a laser beam toward the knife edge; and
    injecting said material composition powder co-axially into the laser beam such that the material composition powder is melted by the laser beam and is deposited on the knife edge and wherein said material composition comprises chromium 8.0-11.0%, cobalt 13.0-17.0%, molybdenum 2.0-4.0%, vanadium 0.70-1.20%, titanium 4.50-5.00%, aluminum 5.0-6.0%, carbon 0.15-0.20%, boron 0.01-0.02%, zirconium 0.03-0.09%, iron 1.0% maximum, manganese 0.20% maximum, silicon 0.20% maximum, sulfur 0.015% maximum, with the remainder being nickel.

13. The method of claim 12, wherein the material composition is deposited on the knife edge in layers.

14. The method of claim 13, wherein a maximum thickness of each of the layers is approximately 1.27 mm.

15. The method of claim 13, wherein a maximum thickness of each of the layers is approximately 0.64 mm.

16. The method of claim 12, wherein, in dispensing the material composition powder, a maximum particle size of the powder is 149 μm.

17. The method of claim 12, wherein, in dispensing the material composition powder, a maximum particle size of the powder is 44 μm.

18. A method for repairing a gas turbine knife edge seal comprising:
    inspecting a knife edge of a gas turbine disk, the disk being formed of a material composition;
    determining that the knife edge is degraded;
    directing a laser beam toward the knife edge; and
    forming a layer of said material composition on the knife edge using the laser beam and said material composition powder and wherein said material composition comprises chromium 8.0-11.0%, cobalt 13.0-17.0%, molybdenum 2.0-4.0%, vanadium 0.70-1.20%, titanium 4.50-5.00%, aluminum 5.0-6.0%, carbon 0.15-0.20%, boron 0.01-0.02%, zirconium 0.03-0.09%, iron 1.0% maximum, manganese 0.20% maximum, silicon 0.20% maximum, sulfur 0.015% maximum, with the remainder being nickel.

19. The method of claim 18, wherein forming a layer comprises dispensing said material composition powder such that the said material composition powder is melted by the laser beam and is deposited on the knife edge.

20. The method of claim 19, further comprising forming additional layers of said material composition, sequentially, on the knife edge.

21. A method for repairing a gas turbine engine knife edge seal comprising:

providing a knife edge of a gas turbine component, the component comprising a material composition, the knife edge being degraded;

directing a laser beam toward the knife edge; and dispensing said material composition powder such that said material composition the powder is melted by the laser beam and is deposited on the knife edge in separately formed layers and wherein a maximum thickness of each of the layers is approximately 1.27 mm and wherein said material composition comprises chromium 8.0-11.0%, cobalt 13.0-17.0%, molybdenum 2.0-4.0%, vanadium 0.70-1.20%, titanium 4.50-5.00%, aluminum 5.0-6.0%, carbon 0.15-0.20%, boron 0.01-0.02%, zirconium 0.03-0.09%, iron 1.0% maximum, manganese 0.20% maximum, silicon 0.20% maximum, sulfur 0.015% maximum, with the remainder being nickel.

* * * * *

UNITED STATES PATENT AND TRADEMARK OFFICE
CERTIFICATE OF CORRECTION

PATENT NO. : 8,089,028 B2
APPLICATION NO. : 11/782057
DATED : January 3, 2012
INVENTOR(S) : William M. Rose Page 1 of 1

It is certified that error appears in the above-identified patent and that said Letters Patent is hereby corrected as shown below:

IN THE CLAIMS:

Claim 21, Column 6, line 6: delete the first occurrence of "the"

Signed and Sealed this
Twenty-first Day of February, 2012

David J. Kappos
*Director of the United States Patent and Trademark Office*